July 22, 1952     J. B. RUHLIN     2,604,232
DETACHABLE POURING LID FOR LIQUID CONTAINERS
Filed Aug. 9, 1948
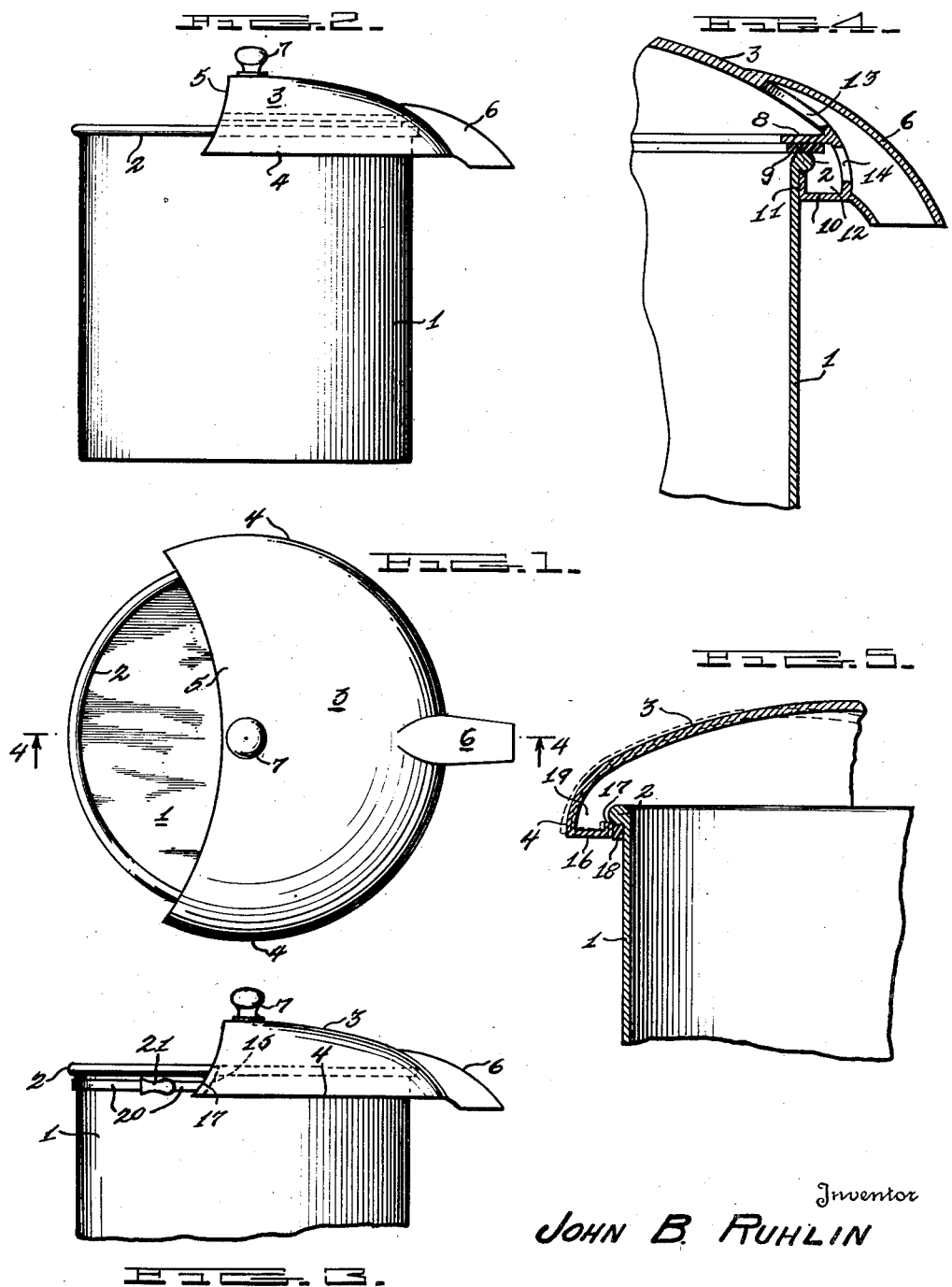
Inventor
JOHN B. RUHLIN
By
Semmes, Keegin, Robinson & Semmes
ATTORNEYS Patented July 22, 1952

2,604,232

UNITED STATES PATENT OFFICE 2,604,232

DETACHABLE POURING LID FOR LIQUID CONTAINERS

John B. Ruhlin, Akron, Ohio

Application August 9, 1948, Serial No. 43,307

4 Claims. (Cl. 222—108)

This invention relates to lids for containers and has specific reference to a detachable pouring lid for liquid containers, such as, for example, cooking utensils.

In pouring liquids from containers, it is difficult to maintain a confined flow of liquid from the lip of the container. Some of the liquid content is usually spilled and wasted, the liquid soiling the outside of the container. Various types of funnels and spouts have been provided heretofore for attachment to such containers to overcome these difficulties. These devices have not proved satisfactory, however, because they do not fit firmly on the container, and lack any seal between the spout and the container lip to prevent leakage therebetween. Furthermore, the pouring of the liquid from the container must be done carefully to prevent spilling or overflow of the liquid around the sides of the spout or lid.

It is a primary object of this invention to provide a novel type of pouring lid for association with a liquid container, the lid fitting securely around the top of the container and preventing spilling of liquids over the sides of the container, as the liquids are decanted from the container.

Another object of this invention is to provide a detachable pouring lid of resilient construction which is firmly attachable to a container merely by collapsing the lid for placement on the container, and then releasing the lid, permitting the natural resilience of the lid to cause the lid to spring back into normal position, securing the lid on the container.

Another object of this invention is to provide a detachable pouring lid for a liquid container with means provided for forming a liquid-tight seal between said lid and said container.

Another object of this invention is to provide a detachable pouring lid for liquid containers having a peripheral channel around the inside of said lid, forming a trough for carrying liquids which may spill over the sides of said container during a decanting operation toward a pouring spout on the lid.

Still another object of this invention is to provide a detachable pouring lid for liquid containers of simple construction which may be economically manufactured in quantity.

Other and further objects of this invention will be apparent from the drawings and the following detailed description thereof which is set forth for the purpose of explaining the invention and is not to be regarded as necessarily limiting the scope of the invention, which is defined in the appended claims.

In the accompanying drawings:

Figure 1 is a plan view of the detachable pouring lid of this invention attached to the open top of a container;

Figure 2 is a side elevational view of the lid secured in position on a container;

Figure 3 is a partial side elevational view of a container with the lid in position being further secured by extending the lips of said lid and securing the ends of the lips with a securing means such as a snap latch;

Figure 4 is a cross sectional view of the lid taken along the line 4—4 of Figure 1, showing a construction in which the bead rim of a container is gripped from above and below by the lid; and Figure 5 is a transverse elevational section of the lid showing a modified construction wherein a member on the lid grips the container immediately below the bead rim, forming a liquid-tight seal therewith, the lid being shown in collapsed position by the dotted lines.

In its broadest concept, the present invention embodies a detachable pouring lid for a liquid container having an open top with a bead rim, the lid comprising a flexible top member which covers more than half the area of the top of the liquid container and which is adapted to be positioned on the container, collapsed with the application of pressure, and sprung securely in place on said container. The lid is provided with means for collecting any liquid which may spill over the sides of said container during a liquid decanting operation, and further means are provided for forming a liquid-tight seal between the lid and said container.

Referring now in particular to the drawings, Figure 1 shows a conventional type of container 1 for carrying liquids or semi-liquids. An annular bead or flange 2 may be formed adjacent the top edge of the container to strengthen the container. A detachable pouring lid 3 of flexible water-proof material such as, for example, aluminum, is shown in Figures 1 and 2 in secured position over the open top of the container, the lid being formed with a rim portion 4 extending downwardly and over the container edge. As shown in Figure 1, the lid 3 is of greater diameter than the open top of the container 1. Also, the lid 3 is formed with an arcuate section removed as at 5, whereby the lid 3 covers more than half but less than the entire area of the open top of the container, the lid area extending beyond the diametric center of the container top thereby facilitating the pouring of liquids without spilling or dripping down the side of the container.

As shown in Figure 1, a spout 6 is secured to the lid 3 by welding or otherwise, the spout protruding from the lid well over the lid edge 4. A knob or handle 7 is conveniently positioned on top of the lid, at its radial center.

The pouring lid 3 is designed for quick attachment and detachment from the top of a container. The lid 3 is shown as used in connection with containers of the type provided with a reinforcement member such as the bead 2, positioned adjacent the top edge of the container. In accordance with the invention, the flexible lid 3 may be collapsed by depressing the knob 7 to expand the lower circumference or opposed portion 4 of the lid so that it may be fitted over the bead 2, for example, of the container. The lid 3 normally is positioned in secured relation with the container as shown by the solid lines in Figure 5. The lid in collapsed or compressed position is shown by the dotted lines in Figure 5. To attach the lid to the container, one presses down on the knob 7, causing the sides 4 of the lid to spring outwardly to position as shown by the dotted lines. The lid 3 is then placed over the container and the knob raised while pushing down on the perimeter of the lid, the lid snapping into secured position on the container rim.

An advantage of the invention resides in the rim construction of the lid, whereby the lid positively grips the container forming a liquid-proof seal therewith. Figure 4 shows one method of construction whereby this may be accomplished. The container 1 with the bead rim top 2 is shown therein with the lid 3 attached thereto. The lid 3 is provided with an inner flange 8 running entirely around the inside periphery of the lid. A gasket or other sealing means 9 is disposed below the flange 8 covering the entire lower surface of the flange. The lip of the lid 3 is turned inwardly to form a horizontal member 10, the inner edge of the member 10 being turned up to form a peripheral lip 11 which runs entirely around the inside of the lid and rests in sealing engagement with the container, adjacent the bead 2. A channel 12 is thus defined by the member 10 and the lip 11.

When the lid 3 is collapsed by depressing the handle 7, the edges of the lid are forced outwardly from the radial center of the lid, whereby the member 10 and lip 11 may be fitted over the bead 2. The lid is lowered over the container top until the member 10 and lip 11 clear the bead 2 and then the lid is snapped back to its normal position. The member 10 snaps firmly around the container 1 with the lip 11 positioned directly beneath and adjacent the bead 2, sealing the flange 8 with its associated gasket 9 being pressed firmly down against the top of the container rim by the pressure of the lip 11 below said rim. Thus, the top of the container is sealed against accidental leaking or spillage of liquid under the area of the lid 3.

In pouring liquids from the container, upon canting the container, the liquid passes through an aperture 13 into the spout 6, for discharge. Provision is made for the disposition of any liquid which may escape around the seal 9, as, for instance, if the bead rim of the container is dented or otherwise deformed. In such case the liquid escaping under the seal 9 collects in channel 12 when the container is tiled for pouring. Liquid collected in the channel 12 is discharged into the spout 6 through an aperture 14 formed in the cover 3. A closure or end wall 15 shown in dotted line in Figure 3, seals off the channel 12. Thus, all liquid passes from the container through apertures 13 and 14 to discharge through the spout 6.

A modified form of means for securing the lid of the invention in sealed relationship with a container rim, is shown in Figure 5. In this form, the container 1 with the bead rim top 2 is provided with the lid 3 detachably secured to it.

The outer edge 4 of the lid 3 is underturned to form a horizontal floor 16 which has its inner edge turned up to form a peripheral lip 17. A gasket or similar sealing means 18 is fixed to the inner edge of said lip 17, providing a liquid-tight seal between the lid and the container. A channel 19 is formed by the floor 16 and lip 17 of said lid to catch liquids which spill over the sides of the container when it is tilted, the liquids being carried to the spout 6 of the lid 3. The seal 18 prevents any leakage of liquid down the side of the container. A closure or end wall (not shown) at each circumferential end of said channel 19 prevents any liquid from escaping out of the ends of said channel, as, for instance, if the container is returned to the upright position with some liquid still remaining in the channel.

The lid of Figure 5 is easily attached to the container by collapsing the lid to expand the lip 17 and its associated gasket 18 outwardly whereby the said members may be slipped over the rim 2 and then snapped into position directly beneath and adjacent the bead.

In some instances, it may be desired positively to secure the lid 3 of the invention on a container which may or may not be provided with a bead 2 on the upper edge. In such case, the ends of the lip 17 may be provided with bands 20 extending around the perimeter of the container as shown in Figure 3. The ends of said bands 20 may be joined by a conventional type snap latch 21 which pulls the bands together, tightening the bands around the container, as the latch is secured.

Thus, a very tight seal is made between the lip 17 of the channel 19 and the side of the container, through compression of the gasket 18. Here, also, the ends of the channel 19 within the lid are closed by end walls 15 at each end of the channel adjacent the arcuate edge 5 of the lid 3.

While the foregoing description and the drawings have reference to preferred embodiments of the invention, it is to be understood that changes in construction and arrangement and combination of parts, materials, dimensions, etc. may be made as may prove expedient without departing from the spirit of the invention.

I claim:

1. A detachable pouring lid for use with a container having an open top comprising a flexible lid body member having an outer edge, said lid body member having a pouring aperture, a peripheral member extending inwardly from said outer edge, a peripheral lip on said inwardly extending member for engagement in liquid-tight connection with the container wall, said lid being deformable to expand laterally for placement around said container to form said engagement, and a peripheral flange on said lid and spaced vertically from said peripheral lip for sealing engagement with the rim of the open top container.

2. A detachable pouring lid for use with a container having an open top comprising a flexible lid body member having an outer edge, said member having a pouring aperture, a peripheral member extending inwardly from said outer edge, a peripheral lip on said inwardly extending member for engagement with the container wall, said lip being deformable to expand laterally for placement around said container to form said engagement, said peripheral member and lip defining a channel between the outer edge of the lid and the container wall for collecting liquid which may spill over the sides of said container during a pouring operation, a peripheral flange on said lid and spaced above said peripheral lip, and a sealing member on the bottom of said flange to form a second seal between the container rim and said lid.

3. A detachable pouring lid for use with a container having an open top comprising a flexible lid body member having an outer edge, said member having a pouring aperture, a peripheral member extending inwardly from said outer edge, a peripheral lip on said inwardly extending member for engagement in liquid-tight connection with the container wall, said lip being expandable laterally from normal position for placement around said container to form said engagement, said peripheral member and lip defining a channel on said lid positioned between the edge of the lid and the container wall for collecting liquid which may spill over the sides of said container during a pouring operation, a peripheral flange on said lid and spaced above said peripheral lip but below said pouring aperture, a sealing member on said flange to form a seal between the container rim and said lid, said lid having a second pouring aperture below said peripheral flange and opening into the channel to expell liquids which by-pass said seal from said channel.

4. A detachable pouring lid for use with a container having an open top comprising a flexible lid body member having a pouring aperture, a peripheral member extending inwardly from said outer edge, a peripheral lip on said inwardly extending member for engagement in liquid-tight connection with the container wall, said lip being expandable laterally from normal position for placement around said container to form said engagement, said peripheral member and lip defining a channel between the outer edge of the lid and the container wall for collecting any liquid which may spill over the sides of said container during a pouring operation, a peripheral flange on said lid and spaced above said peripheral lip, a sealing member on the bottom of said flange to form a seal between the container rim and said lid and enclose said channel, said lip and flange and channel extending less than the entire way around the wall of the container, and a closure member at each circumferential end of said channel to prevent liquids from spilling out through said channel ends during a pouring operation.

JOHN B. RUHLIN.

REFERENCES CITED

The following references are of record in the file of this patent:

UNITED STATES PATENTS

| Number | Name | Date |
|---|---|---|
| 1,965,356 | Rittenhouse | July 3, 1934 |
| 1,966,049 | Shera | July 10, 1934 |
| 2,033,931 | Erne | Mar. 17, 1936 |
| 2,465,023 | Leonard | Mar. 22, 1949 |